United States Patent [19]

Steiner et al.

[11] Patent Number: 5,443,726
[45] Date of Patent: Aug. 22, 1995

[54] SELF-CLEANING FILTER ASSEMBLY

[75] Inventors: Carl A. Steiner, Erie; Ricky L. Jackson, Union City, both of Pa.

[73] Assignee: TM Industrial Supply, Inc., Erie, Pa.

[21] Appl. No.: 136,953

[22] Filed: Oct. 13, 1993

[51] Int. Cl.$^6$ ............... B01D 29/075; B01D 29/64
[52] U.S. Cl. .................. 210/393; 210/394; 210/408; 210/414; 29/163.8; 29/902
[58] Field of Search ........... 210/392, 393, 396, 397, 210/408, 413, 414, 452, 497.01, 499, 394; 29/163.8, 902

[56] References Cited

U.S. PATENT DOCUMENTS

| | | | |
|---|---|---|---|
| 2,352,303 | 6/1944 | Young | 210/199 |
| 3,074,556 | 1/1963 | Rosaen | 210/195 |
| 3,074,560 | 1/1963 | Kinney | 210/330 |
| 3,256,990 | 6/1966 | Lundeen | 210/138 |
| 3,357,566 | 12/1967 | Schmid et al. | 210/333 |
| 3,491,889 | 1/1970 | Walters | 210/411 |
| 3,972,817 | 8/1976 | Moe | 210/325 |
| 4,328,103 | 5/1982 | Kraeling, Jr. et al. | 210/411 |
| 4,643,828 | 2/1987 | Barzuza | 210/412 |
| 4,859,335 | 8/1989 | Whyte | 210/393 |
| 4,867,879 | 9/1989 | Müller | 210/392 |
| 4,904,397 | 2/1990 | Eimer et al. | 210/791 |
| 4,935,126 | 6/1990 | Drori | 210/107 |
| 4,971,694 | 11/1990 | Richter | 210/333.01 |
| 5,051,195 | 9/1991 | Haapamäki et al. | 210/784 |
| 5,094,751 | 3/1992 | Ramsey et al. | 210/409 |
| 5,114,574 | 5/1992 | Barry | 210/137 |
| 5,128,029 | 7/1992 | Herrmann | 210/107 |
| 5,152,891 | 10/1992 | Netkowicz et al. | 210/408 |
| 5,164,079 | 11/1992 | Klein | 210/186 |
| 5,164,086 | 11/1992 | Hopgood et al. | 210/391 |

OTHER PUBLICATIONS

Ronningen–Petter advertisement entitled "Announcing Ronningen–Petter's New Paper Coating Filter", date unknown.

Amiad Filtration System advertisement entitled "Amiad Brushaway Assembly for Semi-Automatic Cleaning of Amiad 4"–14" Filters", date unknown.

ClaRite advertisements entitled "Multi-Element Filters & Strainers" and "Heel Recovery Filtration System", date unknown.

Plenty Filters advertisement entitled "Compact Back-flushing Strainers", date unknown.

*Primary Examiner*—Robert A. Dawson
*Assistant Examiner*—W. L. Walker
*Attorney, Agent, or Firm*—Webb Ziesenheim Bruening Logsdon Orkin & Hanson

[57] ABSTRACT

A fluid filter assembly having a body with a chamber for receiving a filter element supported by the body. At least one cleaning device is positioned adjacent the inlet side of the filter element. The cleaning device includes a hollow duct for collecting dislodged particulate matter, an adjustable scraper and a deflector substantially equal in length to the scraper. Nozzles may be provided for directing pressurized cleaning fluid toward the cleaning device.

6 Claims, 10 Drawing Sheets

SELF-CLEANING FILTER ASSEMBLY

BACKGROUND OF THE INVENTION

1. Field of the Invention

This invention relates to improvements in self-cleaning filters. More particularly, this invention relates to filters for fluid media carrying fibrous or other forms of debris which tend to clog the filters.

2. Description of the Prior Art

Strainers and filters are employed to separate solids from fluids. Generally speaking, strainers are used to separate solids with an average width of ⅛ inch to 75 microns. Filters are used to separate solids with an average width less than 75 microns. In the case of strainers, the solids are collected on a screening media or strainer element and thereafter, the solids are removed from the screening media by backwashing. During backwashing, fluid is caused to flow in a reverse direction through the screening media and is collected by a backwash arm to clean the screen, as described, for example, in U.S. Pat. Nos. 4,818,402 and 5,152,891, which are hereby incorporated by reference. As used herein, the term "backwash arm" refers to a suction chamber or collection duct.

Filters typically collect solids in a disposable bag filter element or are provided with brushing or blow down systems to remove the collected solids. A shortcoming of bag filters is that they are expensive. In many cases the collected solids, such as hydrocarbon materials, must be placed in special containers and sent to landfills. Further, the brush and blow down type systems are inefficient and periodically require hand cleaning of the filter element resulting in expensive downtime and labor costs.

Accordingly, it is an object of this invention to provide a filter that is less expensive and more efficient to operate than the prior art filters.

SUMMARY OF THE INVENTION

Briefly, according to this invention, there is provided a filter assembly comprising a body defining a chamber for receiving a cylindrical filter element. The space outside the filter element comprises an inlet cavity. The filter element is positioned within the chamber and attaches to the body. The cylindrical filter element has an external inlet side and an internal outlet side. Fluid being filtered passes through the inlet side and then through the outlet side of the filter element. According to this invention, at least one device for cleaning the inlet side of the filter element is provided within the inlet cavity of the chamber. The device for cleaning includes a hollow duct for collecting particulate matter dislodged from the inlet side of the filter element. The duct is positioned with an inlet slot opening adjacent to the inlet side of the filter element. The duct and the filter element are mounted to be movable relative to each other. An adjustable scraper attaches to the duct and slidably contacts the inlet side of the filter element. The scraper is substantially equal in length to the slot opening in the duct. A fluid deflector attaches to the duct. The deflector is substantially equal in length to the scraper. The deflector is positioned forwardly of the scraper as the filter element rotates toward the duct. The slot opening is positioned between the deflector and the scraper. The deflector has a leading edge positioned in close proximity to the inlet side of the filter element. A cleaning chamber is defined by the scraper, the deflector and the duct. The cleaning chamber is in communication with the inlet surface of the filter element whereby during a backwash mode, the duct and the filter element move relative to each other and fluid is directed into the cleaning chamber and then into the duct.

According to a preferred embodiment, a second cleaning device is provided which is similar to the first cleaning device, and includes a second duct having a second slot, a second adjustable scraper and a second deflector. The first slot is spaced approximately 180° from the second slot and the first slot can be positioned adjacent a first vertical section of the filter element and the second slot is positioned adjacent a second vertical section of the filter element. The first section of the filter element is positioned above the second section of the filter element.

According to a preferred embodiment, nozzle devices are provided for directing pressurized cleaning fluid at a pressure greater than the fluid pressure of the fluid being filtered through the filter element against the inlet side of the element for dislodging particulate matter from the inlet side of the filter element adjacent the deflector.

Preferably, the deflector has a forwardly extending edge adjacent the inlet side of the filter element which constricts the flow into the cleaning chamber so that the velocity of the fluid increases as it enters the chamber to better sweep loosened debris from the inlet side of the filter.

Preferably, the scraper has a trapezoidal cross section with an edge defined by the corner of the trapezoidal cross section being in contact with the inlet side of the filter. The scraper may be made of a polymeric material, such as TEFLON ® or DELRIN ®, or a soft metal such as brass. The scraper must be softer than the filter element normally comprised of a stainless steel wedge wire so that the filter element is not worn away. A scraper shoe may be provided to receive the scraper. The shoe attaches to the duct. A device is provided for adjusting the position of the scraper edge to abut the inlet side of the filter element. The adjusting device may include a threaded adjustment member that contacts with the scraper and the scraper shoe.

A motor is provided mounted to the body so that when the motor is activated, relative rotation of the filter element and the cleaning device takes place.

This invention also relates to a method for modifying a filter having a body, a filter element, a hollow duct for collecting dislodged particulate matter and an adjustable scraper by arranging nozzles adjacent to the inlet side of the filter element where the nozzles direct pressurized cleaning fluid maintained at a pressure greater than the fluid pressure of the fluid being filtered flowing through the filter element against the inlet side of the filter element for dislodging particulate matter from the inlet side of the filter element and connecting a source of pressurized cleaning fluid to the nozzle.

BRIEF DESCRIPTION OF THE DRAWINGS

FIG. 8 is a side view, partially in section, of a subassembly of the filter shown in FIG. 5;

DESCRIPTION OF THE PREFERRED EMBODIMENTS

Figure 1:
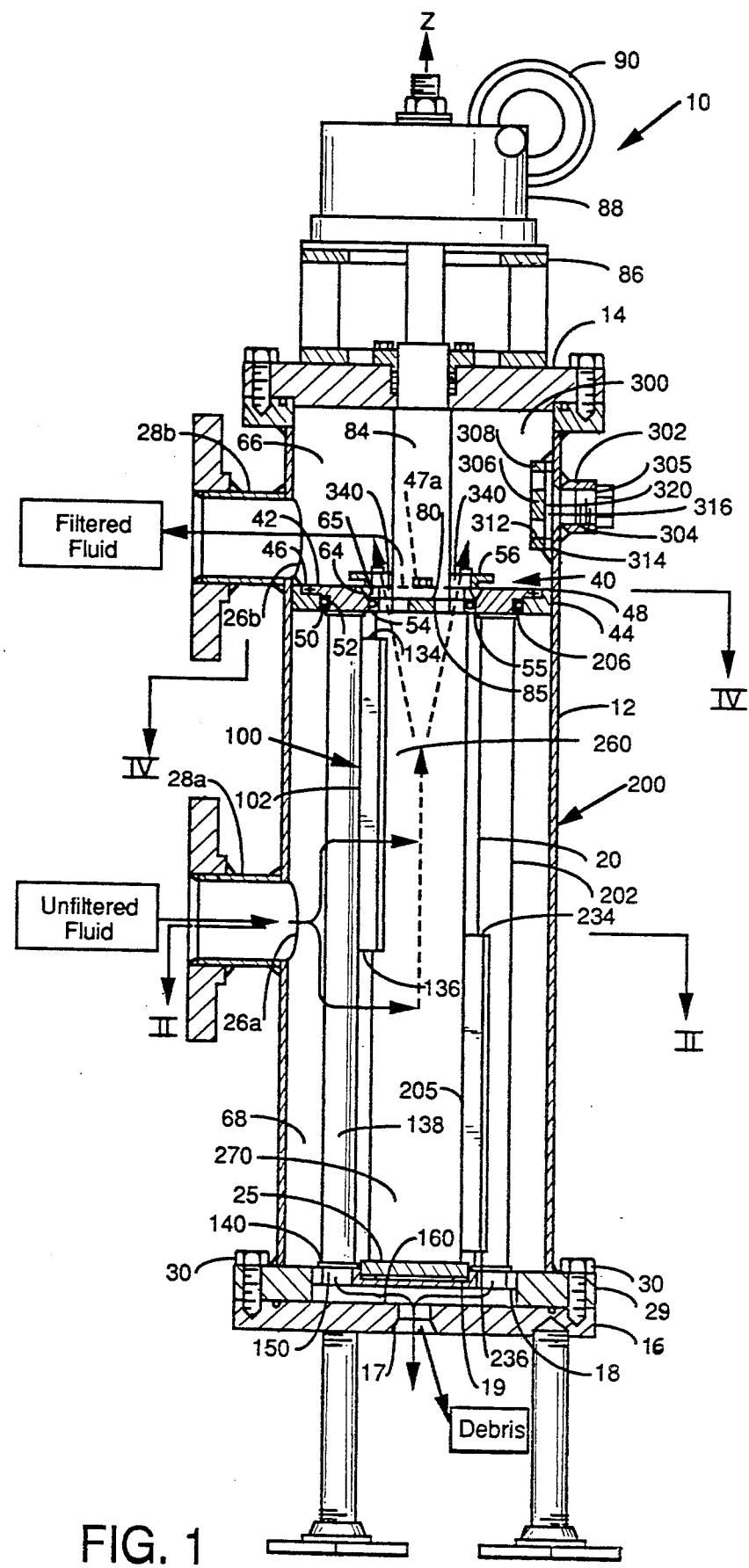
FIG. 1 is a side view of a filter, partially in section, illustrating the present invention.

FIGS. 1 to 5 illustrate a first embodiment according to this invention of a filter assembly 10 having a cylindrical body 12 with a substantially closed top 14 and a substantially closed bottom 16. The bottom 16 includes a drain port 17. A support plate 18 is positioned above the bottom 16 and includes a recess for receiving a filter element. An annular shaped wear ring 19 is positioned at a base of the recess. The filter assembly 10 also includes a cylindrically shaped filter element 20 having an external inlet side 22 and an internal outlet side 24. A blind disc 25, which is circular, is welded to a bottom end of the filter element 20, thus forming a closed bottom open topped cylindrical structure. Preferably, the filter element 20 is a hollow cylinder made of stainless steel wedge wire defining a plurality of slots each having a slot width of about 25 to 50 microns. Filter elements of this type are manufactured by Johnson Corporation and Leem Filtration, Inc., for example.

The body 12 includes an inlet port 26a and an outlet port 26b. An inlet tube 28a is in fluid communication with the inlet port 26a and is welded to the body 12. Likewise, an outlet tube 28b is in fluid communication with the outlet port 26b and is welded to the body 12. An annular alignment plate 29 is welded to a lower end of the body 12. An inner surface of the alignment plate 29 slidably receives an outer surface of the support plate 18. Bolts 30 attach the alignment plate 29 to the bottom 16.

Figure 3:
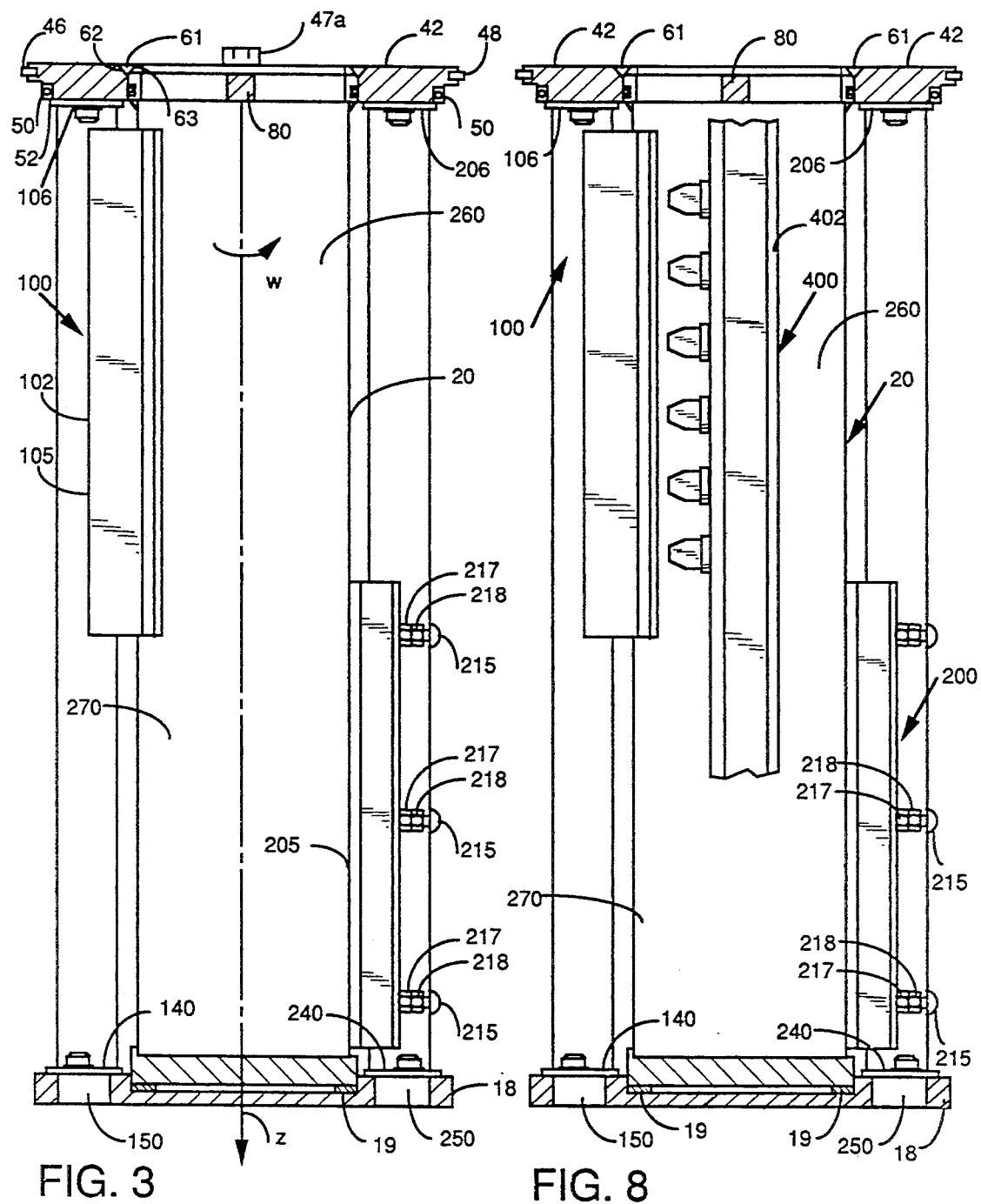
FIG. 3 is a side view, partially in section, of a subassembly of the filter shown in FIG. 1.
Figure 4:
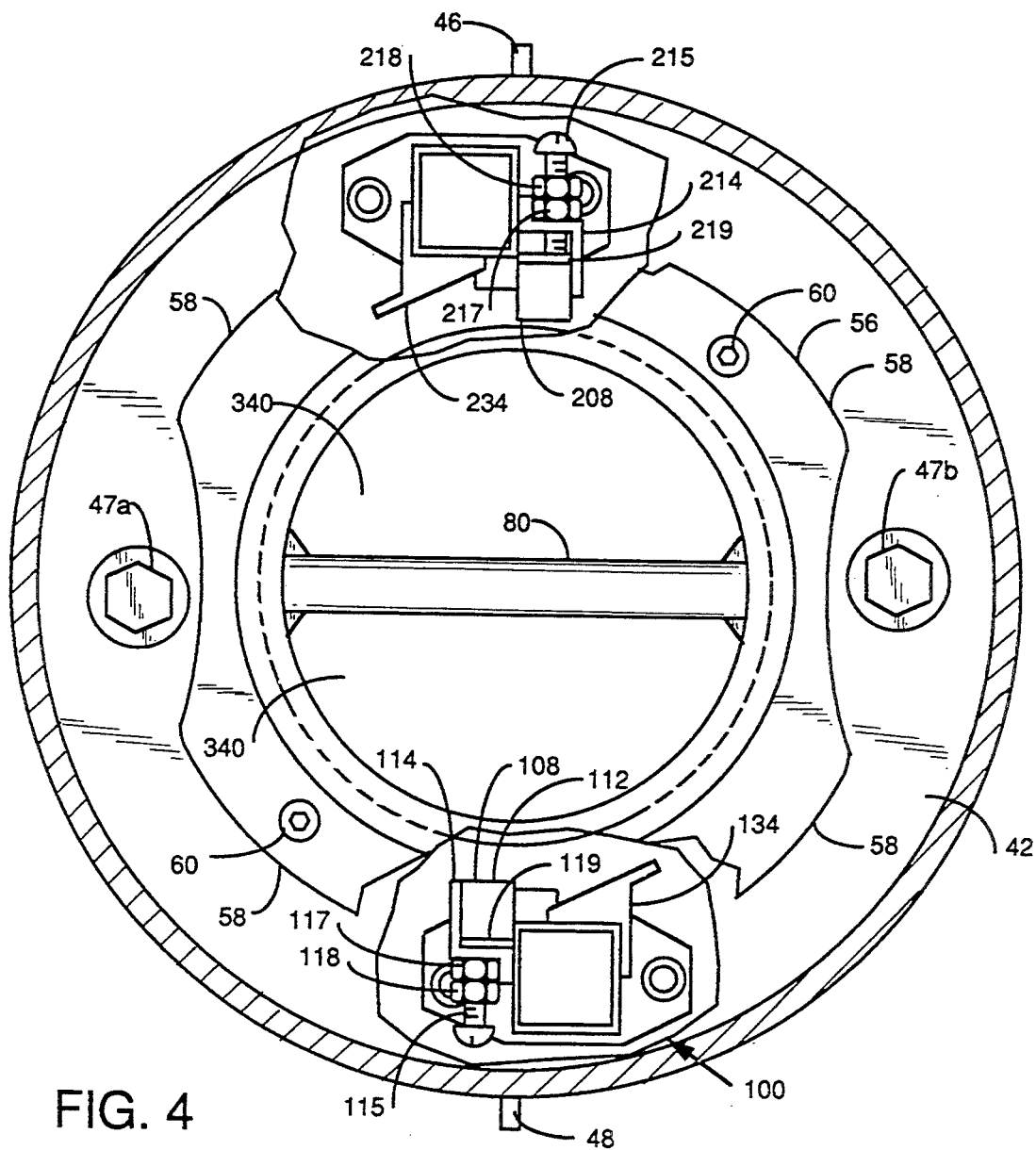
FIG. 4 is a top view of the subassembly shown in FIG. 3.

Filter element 20 is concentrically disposed inside the body 12 wherein the disc 25 is journaled in the recess of the support plate 18 and rests on wear ring 19 (see FIG. 3). The filter element 20 is journaled at the upper end thereof by a locking arrangement 40 comprising an annular upper support plate 42 which is attached to a mounting plate 44 through pins 46 and 48. Support plate 42 rests on annular mounting plate 44 secured to the inside of the cylindrical body 12. Pins 46 and 48 are received by both plates 42 and 44. Two threaded holes spaced apart by approximately 180° pass through plate 42. Threaded plugs 47a and 47b (see FIG. 4) are received by the holes in support plate 42. The annular mounting plate 44 attaches to the cylindrical body 12 through welding and is positioned below the outlet tube 28b. An O-ring 50 is received by an O-ring slot 52 defined on the support plate 42. The O-ring is captured between the support plate 42 and the mounting plate 44 thereby forming a fluid tight seal.

An annular shaped cap 54 (see FIG. 5) is attached to and supports the upper end of the filter element 20. The cap 54 includes an O-ring slot that receives an O-ring or sealing member 55 which is captured between the cap 54 and an inner surface of the support plate 42 in which it is journaled. A retainer ring 56 is positioned above cap 54. Ring 56 also includes four integral tabs 58. The tabs 58 are spaced 90° apart. A fastener 60, such as a bolt, passes through each tab 58 and into threaded holes provided in the support plate 42 thereby holding the cap 54, through ring 56, in place. As is evident, ring 56 is secured to support plate 42. A V-shaped annular space 61 is defined by outer edges 62 and 63 of the plate 42 and cap 54. A V-shaped cross section annular bearing 64 is received in annular space 61. Preferably, the bearing 64 is made of plastic or brass. The bearing 64 is held in place by a bottom surface of an annular retaining lip 65 that is integral to and depends from ring 56. The force applied by the ring 56 via the fasteners 60 causes bearing 64 to be wedged between cap 54 and plate 42 and acts as a bearing surface for cap 54 and as a fluid seal between outer edges 62 and 63 should the O-ring 55 fail.

The upper chamber 66 is defined above filter element 20 and filter element 20 is contained within the lower chamber 68. Accordingly, the filter element 20 is fixed along the cylindrical axis thereof but can rotate about the axis. Furthermore, this arrangement results in a fluid tight seal between an upper chamber 66 and lower chamber 68 of the filter assembly except for the liquid which passes through filter element 20.

A substantially rectangular shaped drive bar 80 (see FIG. 4) is attached to the cap 54 at the upper surface of the filter element 20. Bar 80 is positioned transverse to the cylindrical axis of the filter element axis and bar 80 is adapted to be turned about the cylindrical axis.

A cylindrical drive shaft 84 having a rectangular shaped drive slot 85 at a lower end thereof passes through the upper chamber 66. The slot 85 receives the drive bar 80 as shown in FIG. 1. The drive shaft 84 passes through a centrally positioned hole located in the top 14. Packing material lines the hole and is captured between the top 14 and the shaft 84. The shaft 84 passes through a gear reducer mount 86 and is received by a gear reducer 88. The gear reducer is mechanically coupled to a driving motor 90.

Figure 2:
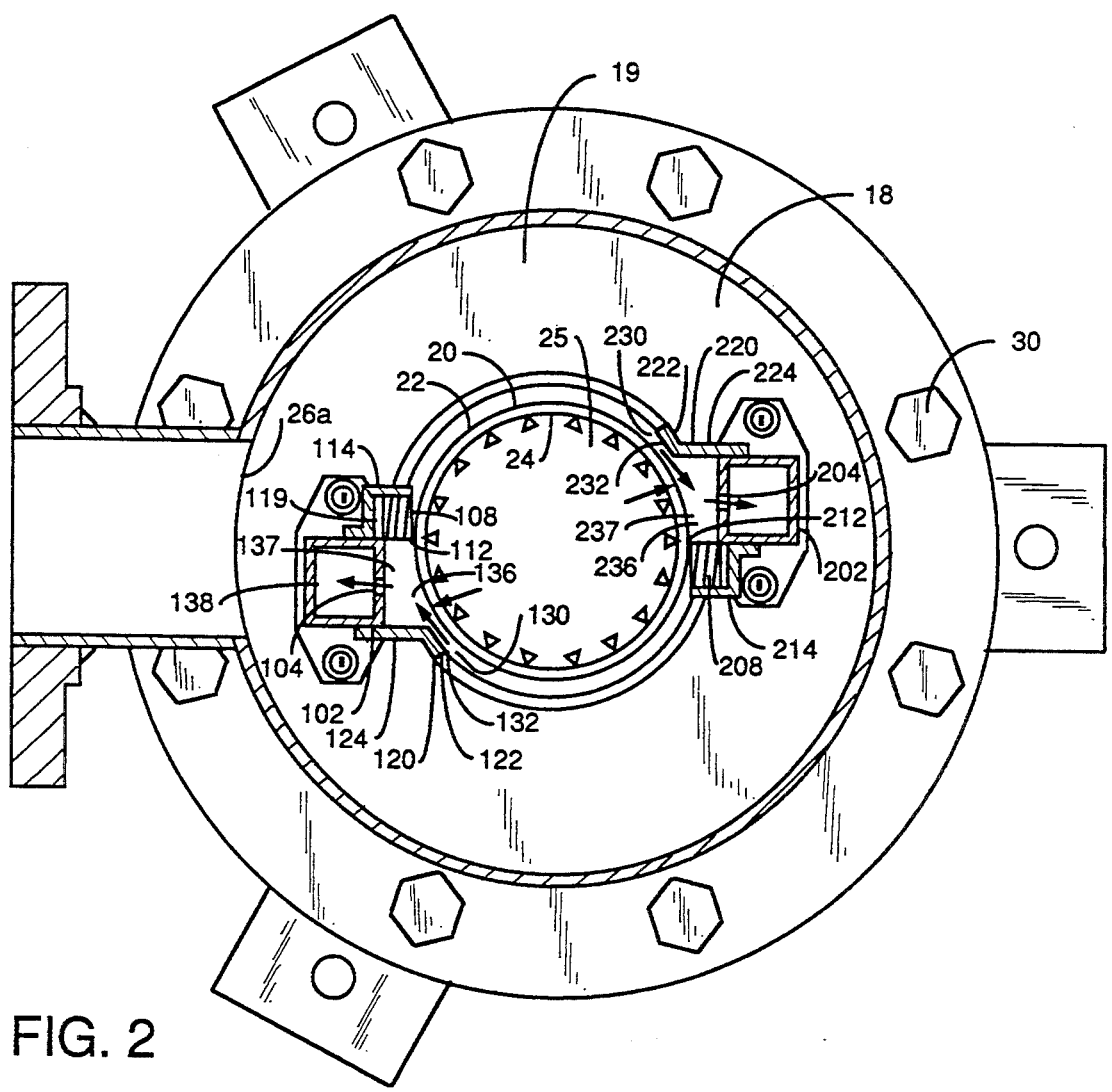
FIG. 2 is top view, partially in section, of a portion of the filter shown in FIG. 1.

The filter assembly 10 further includes a first cleaning assembly 100 that includes an elongated hollow square cross-sectionally shaped backwash arm 102 extending in the longitudinal direction defined by sidewalls (see FIG. 2). A longitudinally extending slot or passageway 104 passes through an upper portion of a sidewall of the arm 102 facing the filter element in an upper section 105 (see FIG. 3) of the backwash arm 102. The backwash arm 102 also includes a closed upper end 106. A longitudinally extending scraper 108 is attached to a wall of arm 102 at a rearward portion of the backwash arm 102 adjacent to and approximately equal in length to slot 104. Preferably, the scraper 108 has a trapezoidal cross section with a tip 112 contacting the filter element inlet side 22. The scraper 108 is slidably received by a longitudinally extending shoe 114. The shoe 114 has a flange and a substantially L-shaped section secured thereto.

The flange attaches to the backwash arm 102, whereby a scraper receiving recess is defined by the shoe 114 and a wall of the arm 102. Holes are provided in the shoe 114 for bolts 115 (of which only one is shown). Two locking nuts 117 and 118 are threadably received by each bolt. Locking nut 117 is welded to the shoe adjacent the hole. A longitudinally extending scraper plate 119 is captured between scraper 108 and shoe 114. Forward ends of the bolts 115 abut and push the scraper back plate 119 against a rear face of the scraper 108. Accordingly, the position of the scraper tip 112 can be adjusted to abut filter element inlet side 22 by rotating the bolt 115 in a clockwise direction until tip 112 contacts side 22 and then tightening nuts 118 so that nuts 118 abut nuts 117 locking the scraper 108 in place. The scraper 108 can be readjusted by loosening the nuts 118 and repeating the above procedure. The length of the upper section 105 of the backwash arm 102 is about half the total length of the filter element 20. Preferably, the scraper 108 is made of a polymeric material such as TEFLON® and DELRIN® or a soft metal such as brass. Alternatively, springs can be provided between scraper back plate 119 and the second shoe section so as to continually urge tip 112 against the filter element 20. This would eliminate the need for adjusting the scraper 108 due to wear.

A deflector 120 is positioned on a forwardly portion of the backwash arm 102 (see FIG. 2). The deflector 120 is substantially L-shaped and includes a first section 122 positioned forwardly of the backwash arm as the filter element rotates toward the arm and a second section 124 which is attached to the backwash arm 102. Preferably, a 0.5 inch or less gap 130 is provided between a forwardly extending edge 132 of the first section 122 of the deflector arm 120 and the filter element 20. This deflector arm 120 is adapted to direct cleaning fluid in a tangential direction to the filter element 20 and then into the slot 104 as will be discussed below.

An upper plate 134 (see FIG. 4) is attached to arm 102 adjacent the upper end of the scraper assembly 108 and the deflector 120. A lower plate 136 is attached to arm 102 adjacent the lower end of the scraper assembly 108 and the deflector 120. A lower end of scraper 108 rests on plate 136. A cleaning chamber 137 (see FIG. 2) is defined by the upper plate 134, lower plate 136, a wall of the arm 102, scraper 108 and deflector 120.

A hollow lower section 138 (see FIG. 1) of the backwash arm 102 extends below slot 104 and includes a flanged lower end 140, which rests on the support plate 18 and above a hole 150 that passes through the support plate 18. The flanged lower end 140 and closed upper end are bolted to plates 18 and 42, respectively. The hole 150 leads into a cavity 160 defined between the support plate 18 and the closed bottom 16. Hence, the chamber 138 of backwash arm 102 fluidly communicates with the cavity 160 through the hole 150.

A second cleaning assembly 200 is spaced apart approximately 180° from the cleaning assembly 100. The second cleaning assembly 200 is similar to the first cleaning assembly and includes an elongated hollow square cross-sectionally shaped backwash arm or duct 202 extending in the longitudinal direction defined by sidewalls and a longitudinally extending slot or passageway 204 passes through a sidewall of the arm 202 in a lower section 205 of the backwash arm 202. The backwash arm 202 has a closed upper end 206. A longitudinally extending scraper 208 is attached to a wall at a rearward portion of the backwash arm 202 adjacent to and approximately equal in length to slot 204. Preferably, the scraper 208 has a trapezoidal cross section with an edge 212 contacting the filter element inlet side 22. The scraper 208 is slidably received by a longitudinally extending shoe 214.

The means for securing and adjusting the scraper 208 and shoe 214 are identical to those for securing scraper 108 in shoe 114. Elements 202 to 218 correspond to elements 102 to 118, respectively.

The means for directing cleaning fluid on filter element 20 comprise deflector 220 and other elements. Elements 220 to 240 of arm 202 correspond to elements 120 to 140, respectively, of arm 102.

As can be seen from FIGS. 1 to 4, the slots 104 and 204 and scrapers 108 and 208 are spaced 180° apart. Furthermore, slot 104 and scraper 108 are positioned adjacent an upper portion 260 of the filter element 20 and the slot 204 and scraper 208 are positioned adjacent a lower portion 270 of the filter element 20, wherein the upper portion 260 and the lower portion 270 are equal in length to approximately one-half the length of the filter element 20 along the cylindrical axis thereof.

An effluent cavity 300, as shown in FIG. 1, is defined in the upper chamber 66. The outlet tube 28b is in fluid communication with cavity 300. A high pressure fluid cleaning plate 302 attaches to an outer surface of the body 12 adjacent to the fluid cavity 300. Plate 302 includes a threaded hole 304 that threadably receives a plug 305. A hose connecting plate 306 having threaded holes 308 and 312 is welded to an inside surface 314 of body 12 that defines a filter chamber 302. A passage 316 is provided in surface 314 so that hole 304 is in fluid communication with holes 308 and 312.

In filter mode operation, a supply of unfiltered fluid passes to inlet port 26a. The drain port is connected to a valve, which exits to atmospheric pressure, and a tank (not shown). As shown in FIG. 1, the unfiltered fluid passes through the inlet tube 28a, through the filter element 20, thereby becoming filtered fluid. The filtered fluid then flows upwardly into cavity 300 through an opening 340 defined by inner surface of support plate 42, cap 54 and retaining ring 56, and then discharges through outlet 28b as shown by the arrows in FIG. 1. Particulate matter (filtrate) is separated from the unfiltered fluid and lodged on the inlet side 22 of the filter element 20 as the filtered fluid passes through the filter element 20.

At spaced time intervals during backwash mode operation, the motor 90 and the gear reducer 88 are activated thereby causing the shaft 84 to rotate in a clockwise direction, which in turn rotates the filter element 20 through drive bar 80 in a clockwise direction $\omega$ about the cylindrical axis of the filter element axis. This in turn causes the scraper edges 112, 212 to scape debris or particulate matter contacting the inlet side of the filter element 20. Simultaneously, a valve (not shown) in communication with the exit port 17 is opened resulting in pressurized fluid flowing from both the inlet side 22 and outlet side 24 of the filter element 20 into the backwash arms 102, 202. The fluid positioned adjacent to the deflector arms 120 and 220 is directed to slots 104 and 204, respectively, as indicated by the arrows in FIG. 2. Unfiltered fluid guided by the deflector arms 120 and 220 tangentially flows against the filter element 20 which further causes additional particulate debris to be removed from the filter element, as shown in FIG. 2. The velocity of the tangentially flowing fluid is a function of the rotational speed of the filter element and the pressure of the fluid contained within the lower chamber 68.

Generally speaking, the higher the operating pressure the higher the tangential velocity, which in turn has a greater effect on removing debris and particulate matter. Accordingly, debris and particulate matter removed by the scrapers 108 and 208, the tangentially flowing fluid and filtered fluid flowing passing back through the filter element 20 adjacent chambers 137 and 237, passes through chambers 137 and 237, slots 104 and 204, down the respective backwash arms or ducts into cavity 160 and outlet port 17 to the tank for subsequent removal.

After a period of time, the motor 90 is deactivated stopping the rotation of the filter element 20 and the valve controlling exit port 17 is closed preventing the flow of fluid through the backwash arms into the tank.

Activation of the backwash mode can be done manually or automatically. Further, the motor can be activated as a function of a specific time interval, say 2 hours, or as a function of the fluid pressure drop across the filter element 20 which is indicative of the amount of debris or particulate matter lodged on the filter element 20.

Spacing the two backwash arms 102, 202, 180° apart and having backwash arm 102 positioned adjacent the upper portion 260 of the filter element 20 and the backwash arm 202 positioned adjacent the lower portion 270 of the filter element 20 results in superior cleaning. It has been found that in cases where only one backwash arm is used over the entire length of the filter element, only a portion of the filter element is cleaned. Further, superior performance is obtained by having scraper 108 contact the filter element 20 as opposed to the teachings of U.S. Pat, Nos. 4,818,402 and 5,152,891, which teach spacing the scraper elements from the strainer element. It is important to note that alternatively the cleaning assemblies 100, 200 could rotate and the filter backwash element remain stationary. In that case, the cleaning assemblies 100, 200 rotate counterclockwise so that effective cleaning could occur. Also, both the filter element 20 and cleaning assemblies 100, 200 could rotate.

In some instances though, especially when the filter assembly 10 is utilized in low operating pressure applications, it is preferable to utilize a nozzle arrangement discharging high pressure cleaning fluid against the filter element 20 in combination with backwash arms previously discussed. Accordingly, FIGS. 6 to 14 illustrate a second embodiment of the invention. The filter assembly 10 of the second embodiment utilizes many of the same elements as the previously described for the first embodiment and, accordingly, like reference numerals will be used for like parts.

Filter assembly 10 further includes a nozzle assembly 400 that includes a hollow shaft 402 having an open upper end 404 and a closed lower end 406. A plurality of holes 408 are positioned in an upper portion of the hollow shaft 402. A plurality of nozzles 410 direct high velocity cleaning fluid toward a forward portion of the first section 122 of the deflector 120 so that the high velocity cleaning fluid passes through gap 130 approximately tangent to the adjacent filter element 20. The nozzles are positioned forwardly of the gap 130.

Figure 13:
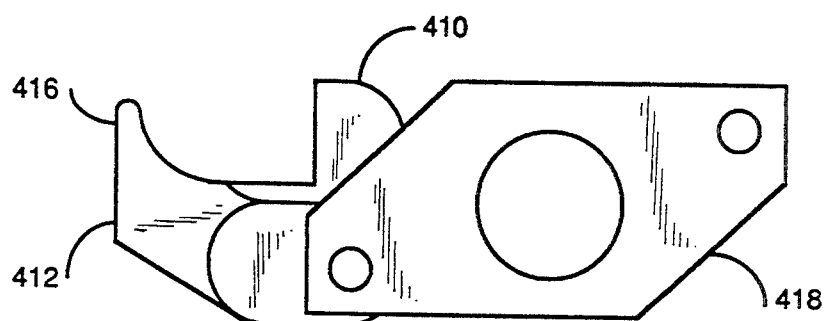
FIG. 13 is a top view of the spray nozzle arrangement shown in FIGS. 11 and 12.
Figure 14:
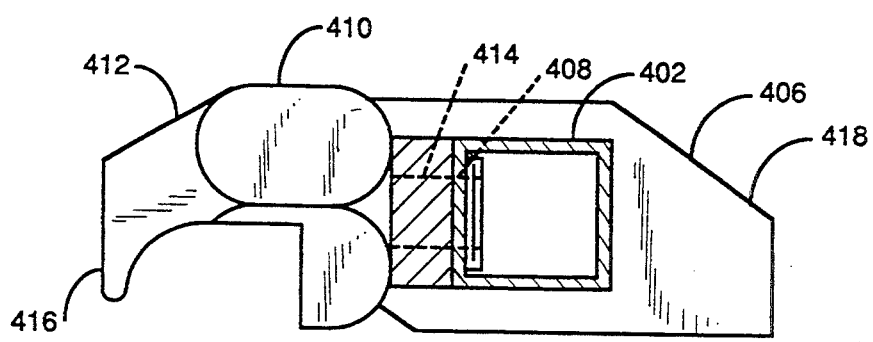
FIG. 14 is a section taken along lines XIV—XIV in FIG. 11.
Figure 5:
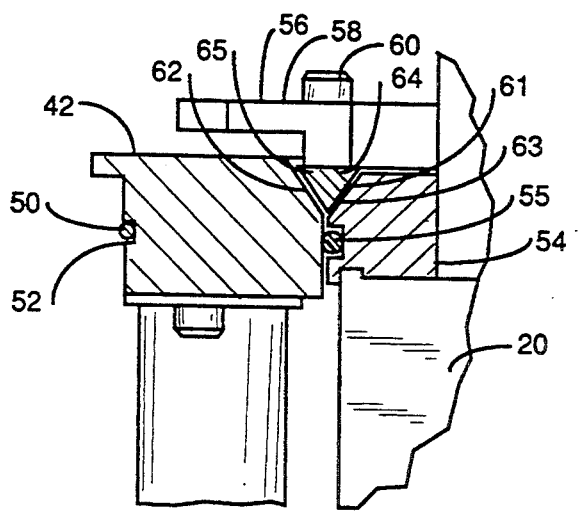
FIG. 5 is a side view, partially in section, of a sealing and bearing arrangement for the filter shown in FIG. 1.
Figure 6:
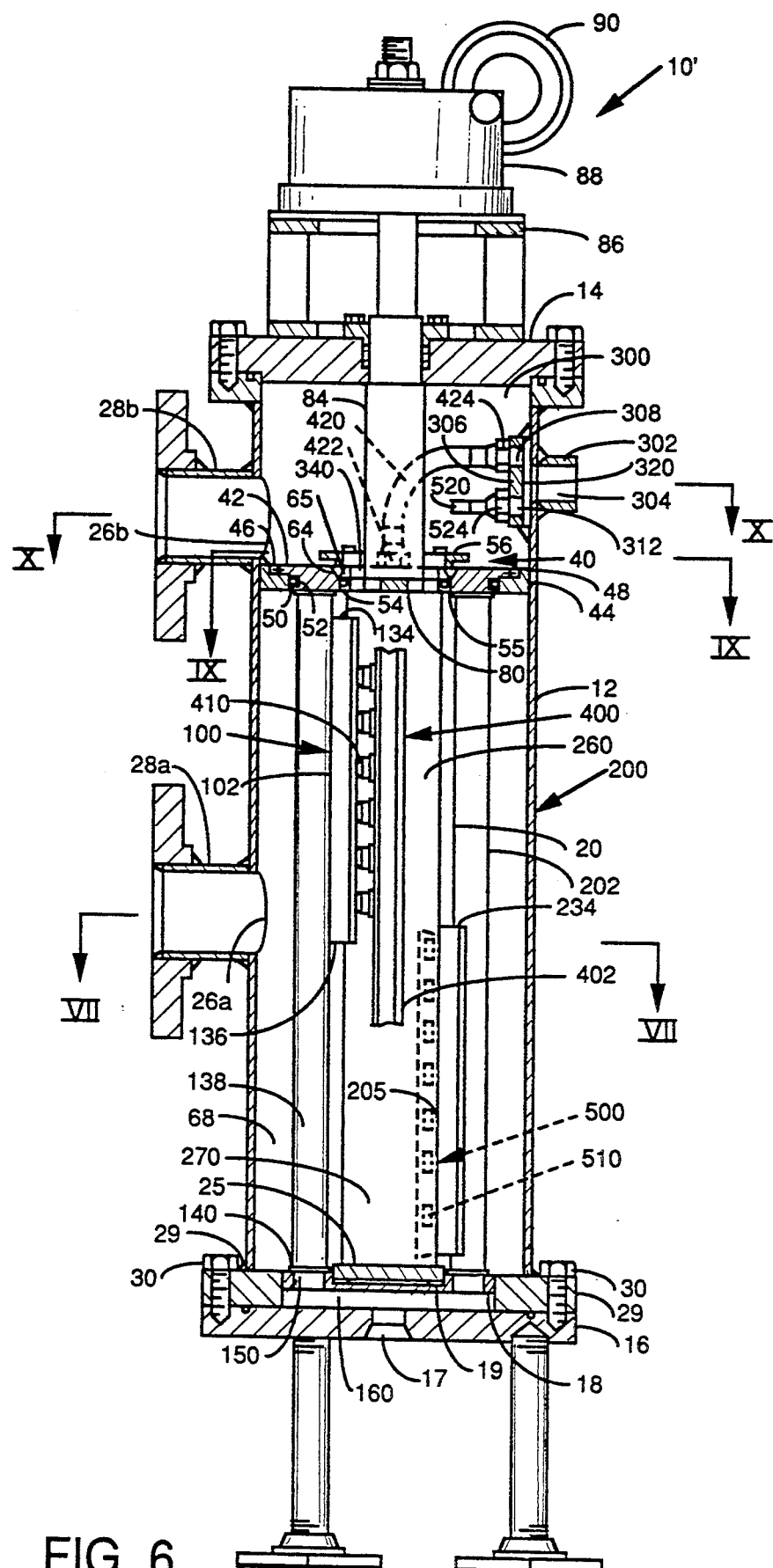
FIG. 6 is a side view of a second embodiment of a self-cleaning filter, partially in section, made in accordance with the present invention.
Figure 7:
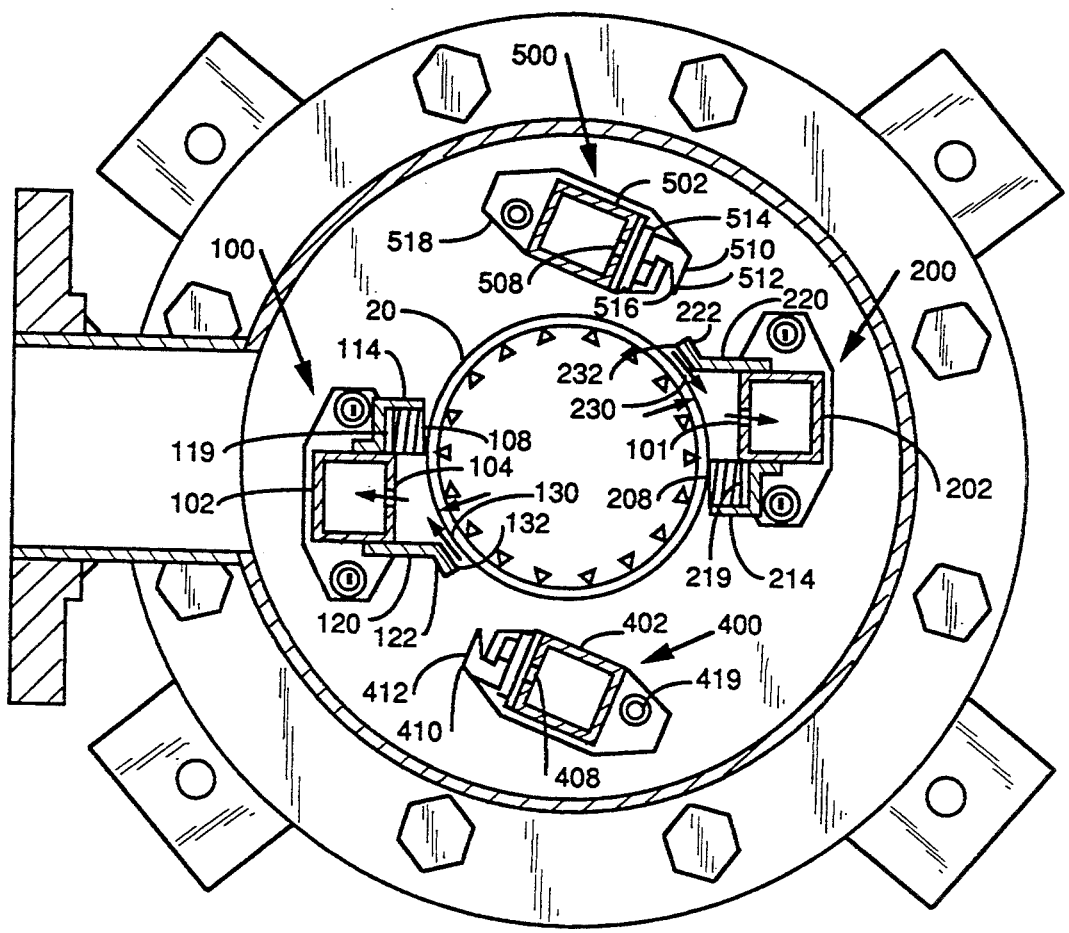
FIG. 7 is a top view, partially in section, of a lower portion of the filter shown in FIG. 6.
Figure 9:
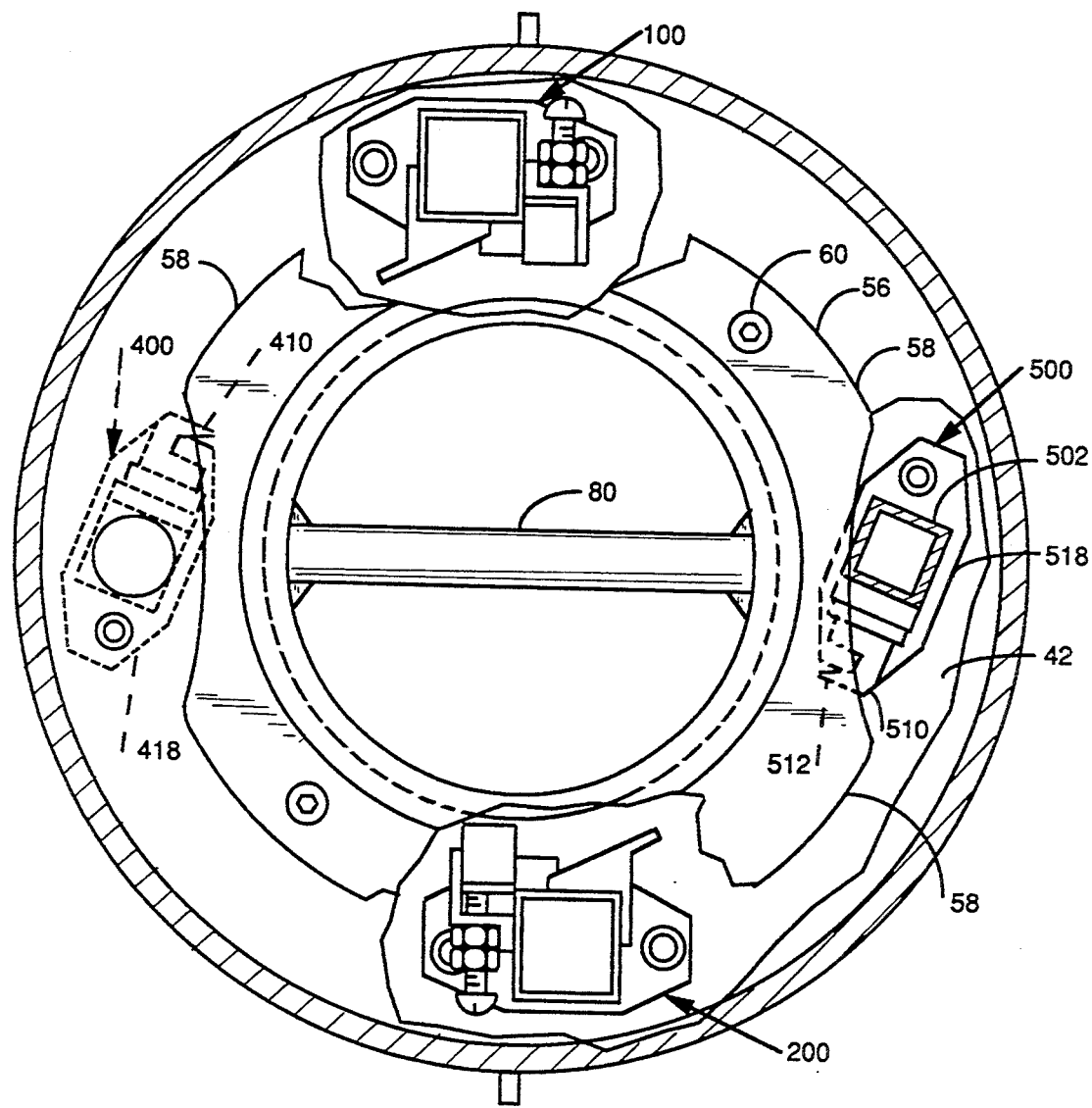
FIG. 9 is a top view of the subassembly shown in FIG. 8.
Figure 10:
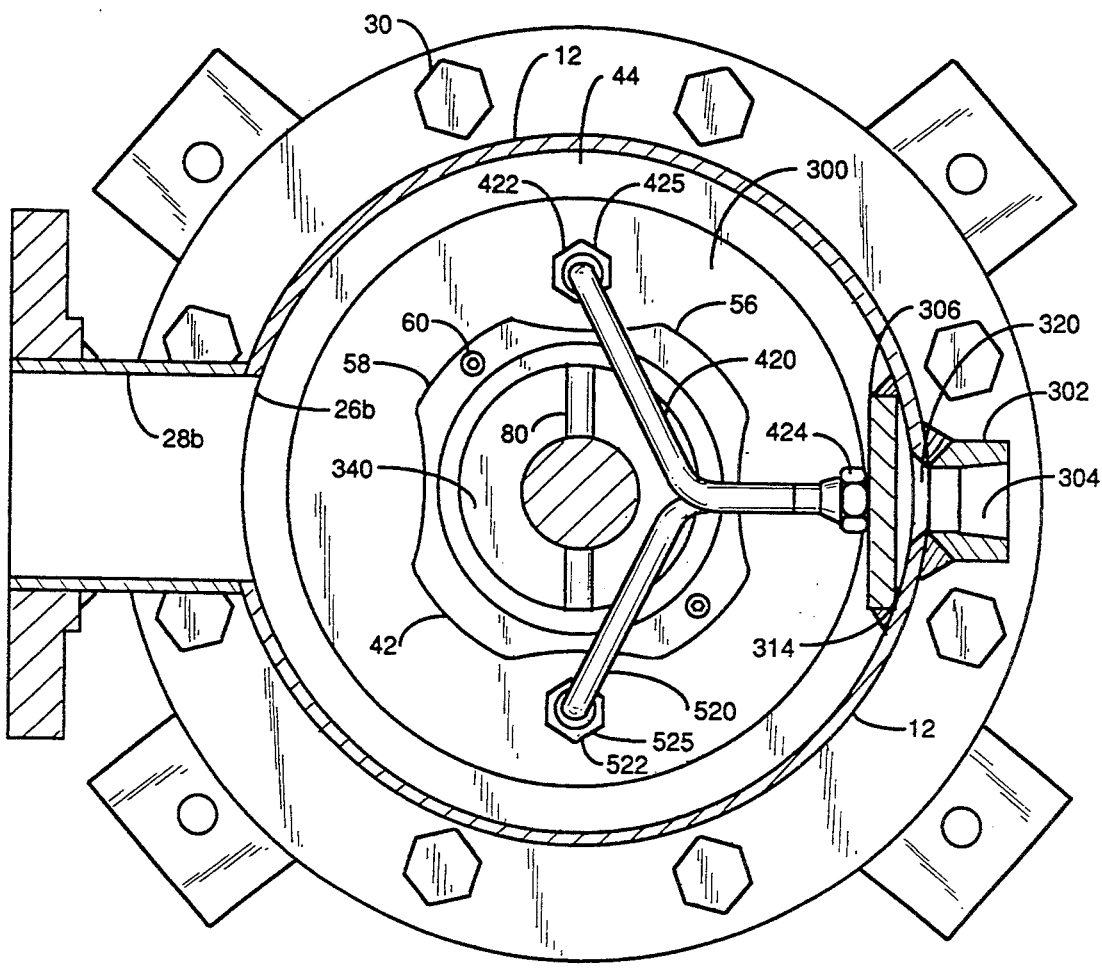
FIG. 10 is a top view, partially in section, of an upper portion of the filter shown in FIG. 6.
Figure 11:
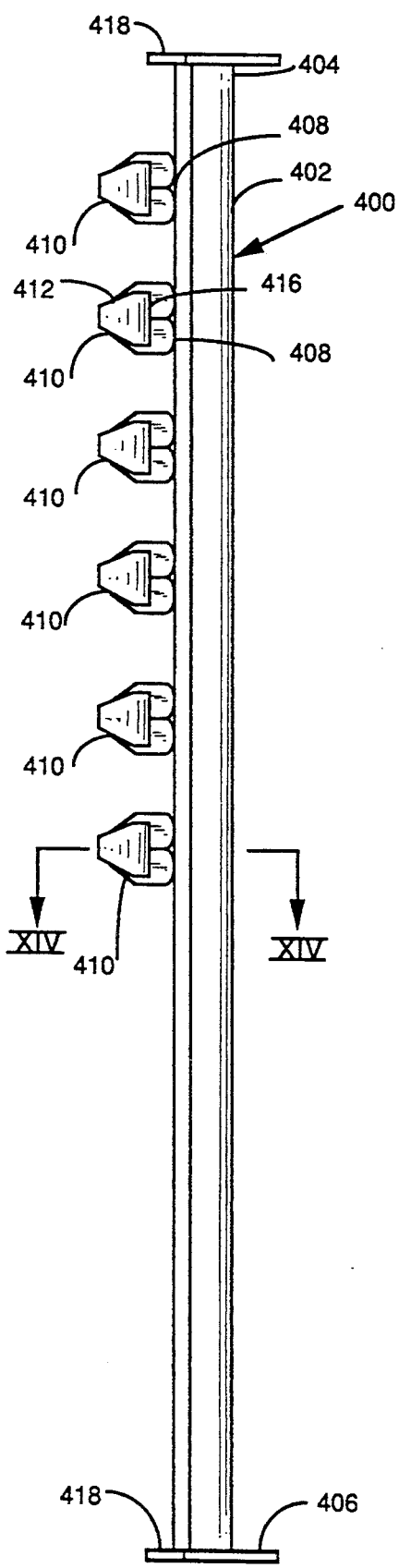
FIG. 11 is a side view of a spray nozzle arrangement made in accordance with the present invention.
Figure 12:
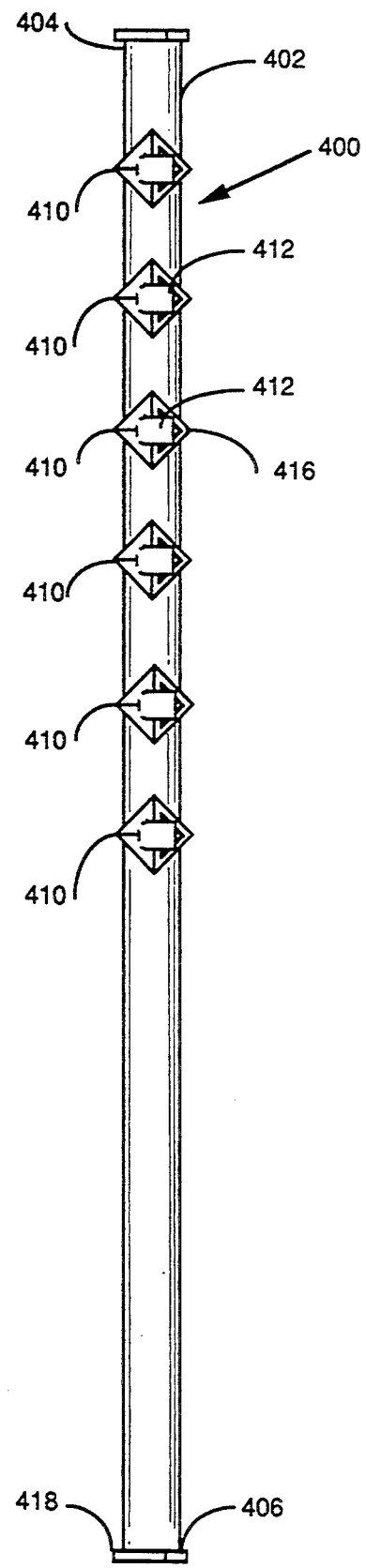
FIG. 12 is a front view of the spray nozzle arrangement shown in FIG. 11.

As shown in FIGS. 13 and 14, each of the nozzles 410 includes a head 412 and a threaded body 414. A deflector tip 416 is provided on the head 412 of the nozzles 410. Stabilizing plates 418 are provided on the upper and lower surfaces of the shaft 402. Stabilizing plates 418 are attached to plates 18 and 42 by welding, or threaded fasteners 419 or any other type of fastener.

A hose 420 (see FIG. 10) is provided having threaded ends 422 and 424. Hose 420 is in communication with the hollow interior of shaft 402. Specifically, end 424 is threadably received by hole 308 of plate 306.

A second nozzle assembly 500 is similar to that of nozzle assembly 400. Elements 500 to 525 correspond to elements 400 to 425, respectively.

A source of high pressure cleaning fluid is connected through a valve to the hole 304 of plate 302 thereby passing high pressure cleaning fluid to the nozzles 510 and 410 via the hoses 520 and 420.

Preferably, the nozzle tips 416, 516 are positioned adjacent to, in close proximity to, and forwardly of the inlet side of the deflector edges 132, 232, respectively, so that during the backwash more high velocity cleaning fluid exiting the nozzles 410, 510 contact the inlet side 22 of the filter element 20 dislodging particulate matter which enters the inlet end of the backwash arm. Preferably, the nozzles discharge cleaning fluid at an acute angle, such as 45°, with respect to the tangent of the inlet side of the filter element at the point of contact of the directed cleaning fluid. One supplier of nozzles 410, 510 is Spraying Systems Co.

The operation of the second embodiment is substantially identical to the operation of the first embodiment. In the backwash mode of the second embodiment, nozzle assemblies 400 and 500 may be activated. However, it may not be necessary to activate the nozzles for every backwash mode.

In some instances, the purchaser of a filter assembly according to the first embodiment may desire to upgrade the filter assembly to include nozzle assemblies 400, 500. In that case, the nozzle assemblies may be installed by removing plugs 47a, 47b and 305 and attaching the nozzle assemblies 400 and 500 to the plates 18 and 42 and attaching the hoses 420 and 520 to plate 306 as previously explained.

Having described the presently preferred embodiments of the invention, it is to be understood that it may otherwise be embodied within the scope of the appended claims.

We claim:

1. A fluid filter assembly comprising:
    a filter body defining a chamber, an inlet, an outlet, and a backwash outlet;
    a cylindrical filter element positioned within said chamber and supported by said body through which a fluid entering the inlet must pass to exit the outlet, said filter element having an inlet side and an outlet side, said filter body and the inlet side of said cylindrical filter element defining an inlet cavity;
    a cap attached to an end of said filter element;
    a support plate secured to said filter body;
    a sealing member captured between said cap and support plate;
    said support plate having an outer edge and said cap having an outer edge, wherein a V-shaped annular space is defined by said support plate outer edge and said cap outer edge;
    a V-shaped cross section annular bearing received in said V-shaped annular space;
    an annular ring secured to said support plate holding said bearing in place, whereby said bearing is wedged between said cap and said support plate; and means for cleaning the inlet side of the filter element comprising:

a hollow duct for collecting particulate matter dislodged from said filter element, said duct supported by said body and positioned within said inlet cavity adjacent to said inlet side of said filter element, said duct and said filter element being movable relative to each other, said duct including a slot opening so that said duct is in fluid communication with said inlet cavity; an elongated adjustable scraper attached to said duct and slidably contacting the inlet side of said filter element, said scraper substantially equal in length to said slot opening; a fluid deflector attached to said duct, said deflector substantially equal in length as said scraper, said deflector being positioned forwardly of said scraper, said slot opening in said duct being positioned between said deflector and said scraper, said deflector having a leading edge positioned in close proximity to said filter element; a cleaning chamber defined by said scraper, said deflector, and said duct, said cleaning chamber in fluid communication with said inlet cavity, whereby when a fluid to be filtered passes from the inlet through the filter element and to the outlet and said duct and said filter element move relative to each other, fluid is directed from said inlet cavity into said cleaning chamber and said duct through which it can be exhausted to said backwash outlet.

2. A fluid filter as claimed in claim 1, wherein said sealing member is an O-ring.

3. A fluid filter as claimed in claim 2, wherein said bearing acts as a bearing surface for said cap and a fluid seal between said support plate outer edge and said cap outer edge should said sealing member fail.

4. A fluid filter as claimed in claim 1 further comprising:

a plate attached to said filter body having a hole defined therein which is in fluid communication with said chamber; and a removable plug is received by said plate in the hole whereby the plate is adapted to be fluidly coupled to a nozzle means attached to said filter body.

5. A fluid filter assembly comprising:

a filter body defining a chamber, an inlet, an outlet, and a backwash outlet;

a cylindrical filter element positioned within said chamber and supported by said body through which a fluid entering the inlet must pass to exit the outlet, said filter element having an inlet side and an outlet side, said filter body and the inlet side of said cylindrical filter element defining an inlet cavity;

a plate attached to said filter body having a hole defined therein which is in fluid communication with said chamber;

a removable plug is received by said plate in the hole whereby the plate is adapted to be fluidly coupled to a nozzle means attached to said filter body; and means for cleaning the inlet side of the filter element comprising:

a hollow duct for collecting particulate matter dislodged from said filter element, said duct supported by said body and positioned within said inlet cavity adjacent to said inlet side of said filter element, said duct and said filter element being movable relative to each other, said duct including a slot opening so that said duct is in fluid communication with said inlet cavity; an elongated adjustable scraper attached to said duct and slidably contacting the inlet side of said filter element, said scraper substantially equal in length to said slot opening; a fluid deflector attached to said duct, said deflector substantially equal in length as said scraper, said deflector being positioned forwardly of said scraper, said slot opening in said duct being positioned between said deflector and said scraper, said deflector having a leading edge positioned in close proximity to said filter element; a cleaning chamber defined by said scraper, said deflector, and said duct, said cleaning chamber in fluid communication with said inlet cavity, whereby when a fluid to be filtered passes from the inlet through the filter element and to the outlet and said duct and said filter element move relative to each other, fluid is directed from said inlet cavity into said cleaning chamber and said duct through which it can be exhausted to said backwash outlet.

6. A method of modifying a filter assembly having a body with a chamber for receiving a filter element and an inlet cavity;

a filter element attached to said body and positioned within said chamber through which a fluid being filtered must pass, said filter element having an inlet side and an outlet side through which the fluid being filtered passes from said inlet cavity, through said inlet side and then through said outlet side;

a plate attached to said filter body having a hole defined therein;

a removable plug received by said plate in the hole; and means for cleaning comprising:

a hollow duct for collecting dislodged particulate matter, said duct mounted to said body and positioned within said inlet cavity adjacent to said inlet side of said filter element, said duct and said filter element being movably mounted relative to each other, wherein said duct includes a slot opening so that said duct is in fluid communication with said inlet cavity; an elongated adjustable scraper extending in the longitudinal direction attached to said duct and slidably contacting said filter element inlet side, said scraper substantially equal in length as said slot opening; a fluid deflector attached to said duct, said deflector substantially equal in length as said scraper, wherein said deflector is positioned forwardly of said scraper and said slot opening of said duct is positioned between said deflector and said scraper, said deflector having a forwardly leading end positioned in close proximity to said filter element; an upper plate attached to said duct adjacent to an upper portion of said scraper and an upper portion of said deflector and a lower plate attached to said duct adjacent to a lower portion of said deflector and a lower portion of said scraper; a cleaning chamber defined by said scraper, said deflector, said upper plate, said lower plate and a portion of said duct containing said slot opening, said cleaning chamber in fluid communication with said inlet chamber, whereby when a fluid to be filtered passes from the inlet chamber through the filter element and through the outlet chamber and said duct and filter element move relative to each other, a portion of the fluid is directed from said inlet chamber into said cleaning chamber and said duct, said method comprising the steps of:

A) attaching to said body a nozzle means for directing cleaning fluid maintained at a pressure greater than the pressure of the fluid being filtered against the inlet side of the filter element for dislodging particulate matter from said inlet side of the filter element, said nozzle positioned within the inlet cavity and adjacent to said inlet side of the filter element and said means for cleaning;

B) coupling a pressurized cleaning fluid source to said nozzle means;

C) removing said plug; and

D) fluidly coupling said plate to said nozzle means.

* * * * *